United States Patent [19]

Augustine et al.

[11] Patent Number: 5,142,610
[45] Date of Patent: Aug. 25, 1992

[54] LIQUID HEATING AND DISPENSING APPLIANCE AND VALVE CONSTRUCTION

[75] Inventors: Robert J. Augustine; Mark Shershen, both of Downers Grove, Ill.

[73] Assignee: Sunbeam Corporation, Providence, R.I.

[21] Appl. No.: 769,147

[22] Filed: Sep. 27, 1991

Related U.S. Application Data

[63] Continuation of Ser. No. 460,449, Jan. 3, 1990, abandoned.

[51] Int. Cl.⁵ .......................... A47J 27/00; F24H 1/18
[52] U.S. Cl. ..................... 392/442; 251/350; 251/353; 222/185; 222/146.5; 222/509
[58] Field of Search ................ 392/442; 251/350, 353; 222/185, 146.5, 509

[56] References Cited

U.S. PATENT DOCUMENTS

| | | | |
|---|---|---|---|
| 549,678 | 11/1895 | Miller . | |
| 999,602 | 8/1911 | Slee | 222/185 |
| 1,992,067 | 2/1935 | Gunn . | |
| 2,376,404 | 5/1945 | Thoms | 251/353 |
| 2,543,850 | 3/1951 | Henricson . | |
| 2,869,764 | 1/1959 | Collins | 251/349 |
| 2,908,479 | 10/1959 | Goodspeed, Jr. | 251/353 |
| 3,151,787 | 10/1964 | Miller . | |
| 3,193,154 | 7/1965 | Bross . | |
| 3,450,146 | 6/1969 | Edwards | 251/342 |
| 3,878,360 | 4/1975 | Augustine et al. . | |
| 3,971,493 | 7/1976 | Williams | 222/185 |
| 4,079,744 | 3/1978 | Franson et al. | 251/350 |
| 4,505,409 | 3/1985 | Armstrong | 222/509 |
| 4,522,318 | 6/1985 | Del Bon | 222/402.24 |
| 4,614,859 | 9/1986 | Beckering et al. | 219/312 |
| 4,908,884 | 3/1990 | John et al. | 251/342 |

Primary Examiner—Bruce A. Reynolds
Assistant Examiner—John A. Jeffery
Attorney, Agent, or Firm—Arnold B. Silverman

[57] ABSTRACT

A liquid heating appliance having a dispensing valve which is supported by a liquid reservoir and which includes an axially compressible conduit connected at its upper end to the reservoir and supporting at its lower end a nozzle, the nozzle supporting a valve member which is unseated by compressing the conduit.

18 Claims, 2 Drawing Sheets

LIQUID HEATING AND DISPENSING APPLIANCE AND VALVE CONSTRUCTION

This is a continuation of U.S. patent application Ser. No. 460,449, filed Jan. 3, 1990, now abandoned.

BACKGROUND OF THE INVENTION

The present invention relates generally to electric appliances for heating liquids and more specifically to an electric appliance for rapidly heating and dispensing a small quantity of water for making instant beverages, tea, coffee, soup and the like. The invention relates to a novel valve construction for use in connection with such an appliance. The disclosed appliance and valve construction represent improvements over the appliances disclosed in the Augustine, et al. U.S. Pat. No. 3,878,360 and Beckering, et al. U.S. Pat. No. 4,614,859.

The objective or function of an appliance of the type with which the invention is concerned is to heat a small quantity of water on the order of sixteen ounces to a boiling temperature in a relatively short period. By employing a relatively high wattage heating element on the order of 1000 to 1400 watts, it is possible to heat the water contained therein to 197° F. and dispense it in a period of less than two minutes.

The appliance is designed to provide a signal when the contents have been heated to the boiling point, at which time the operator may manually operate a valve to dispense the hot water into a waiting receptacle. The dispensing valve must be associated with the heated container in order that the dispensing of the heated contents may be done simply and effectively. Because of the high temperatures associated with the reservoir in which the water is heated and the likelihood of frequent cycling every day during repeated use the demands on the dispensing valve are quite high. The valve must be designed so that it will operate with a minimum amount of force and will continue to operate without any leakage over a substantial period of time. Because of the moist and high temperature environment, metal parts which are exposed to water and then dried quickly have a tendency to rust and seal improperly, and plastic parts have a tendency to deform from the heat. It is also necessary that conduit means be provided to deliver the water from the bottom of the heating vessel to an area outside of the housing in which the heating vessel and its associated electrical components are enclosed. The conduit must be well sealed to avoid any possible leakage in the vicinity of the electrical connections within the housing.

There are known in the prior art various types of valve and conduit combinations which are used primarily in connection with dispensers associated with bottles containing various types of liquids. In some of these prior art valve and conduit patents there are flexible conduits which may be deformed to displace valve members associated therewith. Examples of these prior art patents are Miller U.S. Pat. No. 549,678, Miller U.S. Pat. No. 3,151,787, Henricson U.S. Pat. No. 2,543,850, Gunn U.S. Pat. No. 1,992,067 and Bross U.S. Pat. No. 3,193,154. None of these prior art valves are of a construction that would be suitable for associating with an electric appliance of the type with which the present invention is concerned.

SUMMARY OF THE INVENTION

In order to provide a simple and inexpensive liquid dispensing valve for an electric appliance the present invention utilizes a flexible conduit which is collapsible axially to accomplish the opening of the valve member. The appliance includes a reservoir having an outlet flange to which one end of a flexible conduit is connected. The other and lower end of the conduit is connected to a rigid nozzle which supports the lower end of a valve member having a body portion at the upper end which seals against the opening in the vessel. An operating member engaging the nozzle compresses the conduit which comprises a bellows member to displace the valve body out of engagement with the vessel to move the valve member to its open position.

The disclosed valve and conduit is simple in structure, including only the conduit, a nozzle and a movable valve member to provide an inexpensive, yet very reliable, valve for an electric water heating appliance. The operating means for the valve engages the nozzle and moves it vertically in a direction generally axially of said valve member to move the valve member to the open position. The construction and assembly of the appliance is simplified by having the water reservoir forming a unitary assembly including the heating means and the combination valve and dispensing conduit, which unitary assembly may be easily assembled to the appliance housing.

It is an object of the present invention to provide an improved liquid heating and dispensing appliance which is low in cost and simple to manufacture.

It is another object of the present invention to provide an improved liquid heating and dispensing appliance which includes a simple and reliable valve and conduit for selectively dispensing heated water from a vessel to a cup or container positioned below the vessel.

Another object of the present invention is to provide a simplified valve and conduit including a bellows connected at one end to a water heating reservoir and at the other end to a nozzle which supports a valve member, the nozzle being movable to open and close the valve.

Further objects and advantages will become apparent as the following description proceeds and the features of novelty which characterize the invention will be pointed out in the claims annexed to and forming a part of the specification.

DESCRIPTION OF THE PREFERRED EMBODIMENT

Figure 1:
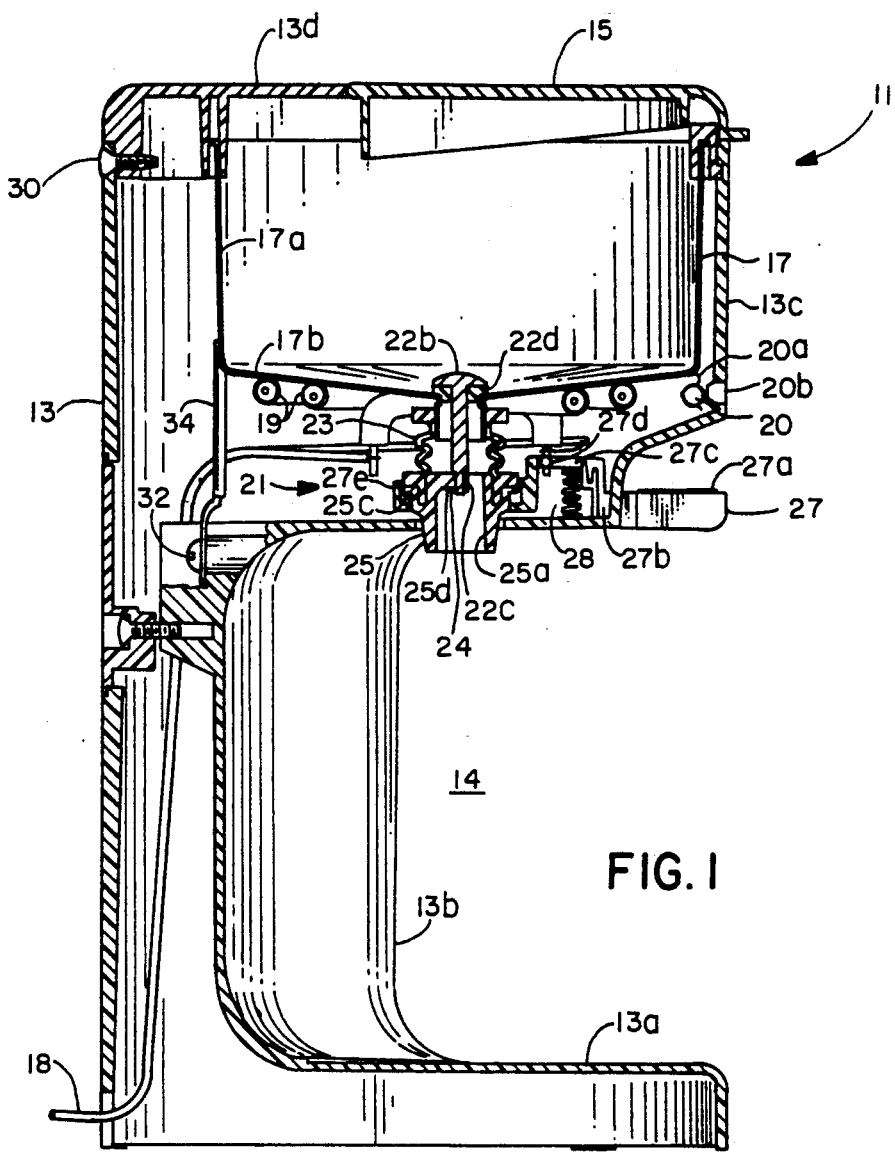
FIG. 1 is a vertical sectional view of an improved heating and dispensing appliance embodying our invention.

Referring to the drawings, there is shown in FIG. 1 a liquid heating and dispensing appliance designated generally by reference numeral 11. The appliance 11 includes a housing 13 having a base portion 13a, a column portion 13b and an upper housing portion or head 13c. As shown in FIG. 1, the housing has a somewhat C-shaped configuration providing a recess area 14 whereby a cup or suitable receptacle may be positioned on the base 13a to receive liquid which is heated in the upper housing portion 13c.

At the top of the housing 13 there is a cover portion 13d which has pivotally connected thereto a lid 15 which may be raised to pour water or liquid into a reservoir 17 fixedly mounted within the head 13c.

Figure 3:
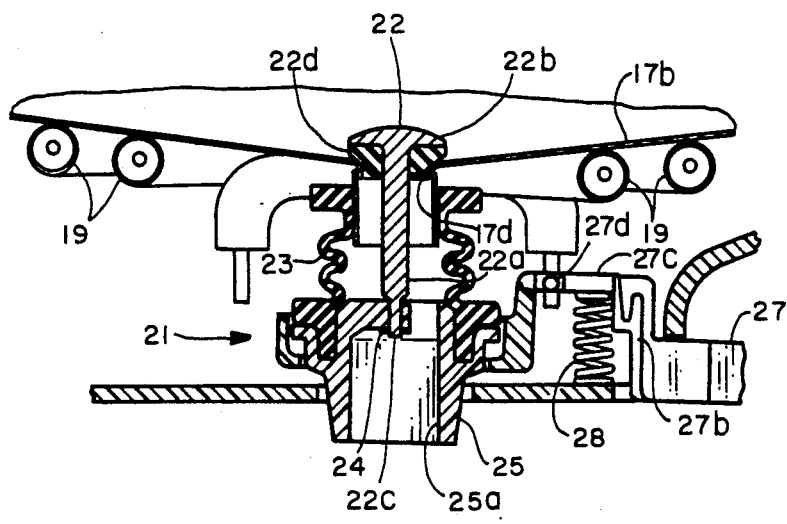
FIG. 3 is an enlarged fragmentary sectional view showing the valve and conduit which is shown in smaller scale in FIG. 1 in the closed position and FIG. 2 in the opened position.
Figure 4:
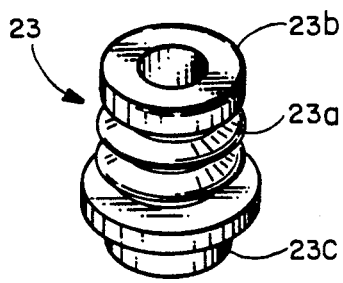
FIG. 4 is a perspective view of the conduit member which forms a portion of the dispensing valve shown in FIG. 3.

The reservoir 17 is a cup-shaped container having cylindrical side walls 17a and a generally flat bottom 17b which tapers toward the center where an opening 17c is defined by the bottom. Extending downwardly from the wall defining the opening 17c is a depending cylindrical flange 17d which is best shown in FIG. 3. In order to heat the contents of the reservoir 17, there is mounted on the bottom 17b of the reservoir a sheathed heating element 19 which has a generally helical configuration with several loops which are generally concentric with the opening 17c and are brazed to the bottom of the reservoir 17 for good heat transfer between the heating element and the bottom of the reservoir.

Figure 2:
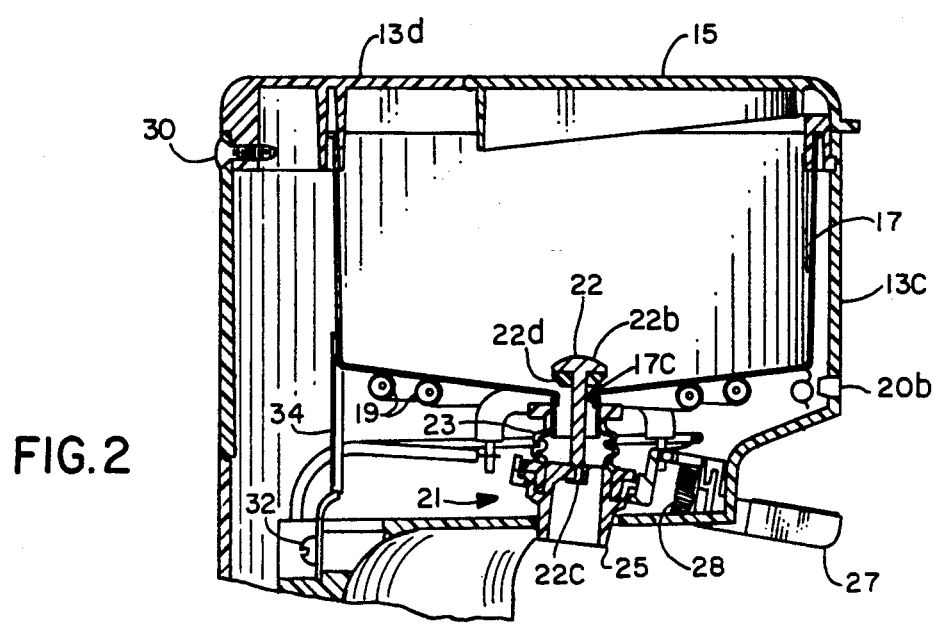
FIG. 2 is a fragmentary sectional view corresponding to a portion of FIG. 1 but showing the liquid dispensing valve in the opened rather than the closed position.

The heating element 19 is controlled by means of a thermostatic switch connected in series with the element 19 across the electrical power supplied by a cord 18. The thermostatic switch is intimately associated with the bottom of the reservoir 17 in a manner described in greater detail in the Beckering, et al. U.S. Pat. No. 4,614,859 and serves to open the power circuit to the heating element 19 when the liquid contents of the reservoir 17 have attained at or about the boiling temperature of water. At that point, a signal light 20 is actuated and the user of the appliance 11 is apprised of the fact that the contents of the reservoir 17 is at the desired temperature to be dispensed into a receptacle for making tea, instant coffee or the like. The light 20 is supported by a bracket 20a brazed to the reservoir bottom 17b and is visible through a lens 20b mounted in an opening in the front wall of housing 13, as shown in FIGS. 1 and 2.

Figure 5:
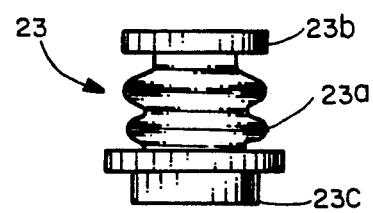
FIG. 5 is an elevational view of the conduit.

There is a combined valve and conduit assembly 21 associated with the opening 17c in the reservoir 17. The assembly 21 includes a valve member 22, conduit 23 and a nozzle 25. The conduit 23 is shown best in FIGS. 5 and 6 and includes a central portion 23a which has a plurality of annular pleats which allow the conduit 23 to be axially compressed since it is made of a silicon rubber which is heat resistant and flexible. Connected to the upper end of the central portion 23a is an upper mounting portion 23b which, in assembled condition on the reservoir 17, is in sealed engagement with the outer surface of the flange 17d extending downwardly from the discharge opening 17c. At the lower end of the conduit 23 there is a lower mounting portion 23c which engages the nozzle 25 so that the nozzle 25 is supported on the bottom of the reservoir 17 by the conduit 23.

Figure 6:
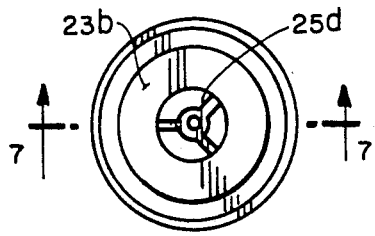
FIG. 6 is a top plan view of the conduit assembled to the nozzle.
Figure 7:
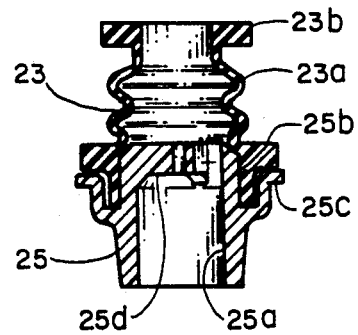
FIG. 7 is a sectional view taken along line 7—7 of FIG. 6 showing the conduit and the nozzle.

The nozzle 25 as shown in FIGS. 3, 6 and 7 is generally cylindrical in shape having a central bore 25a and a collar portion 25b at its upper end which receives the mounting portion 23c of the conduit 23. The mounting portion 23c is considerably smaller in diameter than the collar portion 25b so that the resilience of the silicon rubber of conduit 23 assures a firm sealed engagement between the lower mounting portion 23c of the conduit and the collar portion 25b of the nozzle 25.

Figure 8:
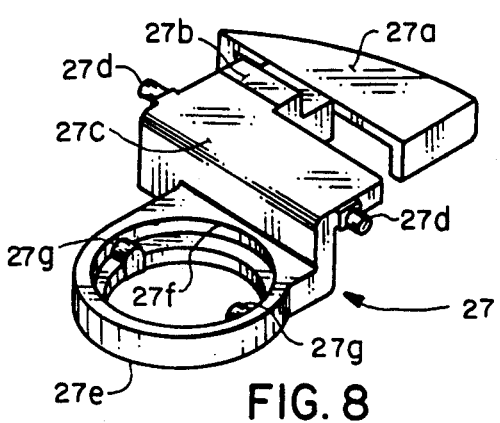
FIG. 8 is a perspective view of the valve operating lever.

Positioned outwardly of the collar portion 25b is a peripheral flange 25c which is engaged by a valve actuating lever 27 which is shown in perspective in FIG. 8. The nozzle 25 is also formed at its upper end with a spider-like support 25d which is rigidly connected to the valve member 22. The spider-like support 25d includes three legs which extend inwardly from the walls of the bore 25a and support a hub having an opening to receive the lower end of the valve member 22.

The valve member 22 includes a stem 22a, a body portion 22b and a reduced diameter lower end 22c which is in a forced fit engagement with the spider-like support 25d of the nozzle 25. The valve member 22 is retained in rigid assembled relation to the nozzle 25 by a retaining washer 24 received on the end 22c beneath the support 25d as shown in FIG. 3. Adjacent the body portion 22b the valve member 22 is provided with a sealing washer 22d which is snugly received on the upper end of the valve stem 22a and abuts the lower face of the body portion 22b. As is evident from FIG. 3, the sealing washer 22d seats against the periphery of the opening 17c in the reservoir 17 when the valve is in its closed position to prevent liquid from exiting the reservoir 17. The conduit 23 and the stem 22a are dimensioned so that the resilience of the conduit biases the valve member 22 to the closed position in the normal at rest position of the parts. As will be explained in greater detail below, the valve operating lever 27 serves to engage the nozzle 25 and displace the nozzle 25 and its associated valve member 22 upwardly, thereby compressing the conduit 23 whereby the parts assume the position shown in FIG. 2 unsealing the opening 17c and permitting liquid to flow through the conduit 23 and the nozzle 25.

Referring to FIG. 8 of the drawings, the valve operating lever 27 is shown as having a handle 27a which comprises the manually actuatable portion extending outside of the housing 13. The lever 27 has a connecting portion 27b which extends through an opening in the front of the head 13c of the housing 13 where it interconnects with a pivot portion 27c. On the opposite ends of the pivot portion 27c are trunnion pins 27d which engage journals formed by molded projections on the inner wall of the housing 13 to support the lever 27 for limited pivotal movement about a horizontal axis. Extending to the left of the pivot portion 27c as shown in FIG. 8 is a yoke 27e which has a circular recess 27f within which the peripheral flange 25c of the nozzle 25 is received.

The yoke 27e is formed with a pair of spaced upwardly facing projections 27g which are designed to engage the lower face of the peripheral flange 25c of the nozzle 25 so as to apply the force of the valve operating lever 27 on a line which lies generally in a vertical plane which would include the axis of the nozzle 25 and the axis of the valve member 22. A coil spring 28 is positioned below the pivot portion 27c of the lever 27 to bias the lever counterclockwise as viewed in FIGS. 1–3 to avoid any tendency of the lever from applying a valve opening force of the nozzle 25. The lower end of spring 28 rests on a horizontal wall portion of the housing 13 and the upper end engages the lever 27 to the right of the axis of pins 27d. To assure proper location of the top and bottom of spring 28 there are provided integrally molded posts on the housing 13 and the lever 27 which extend into the end turns of the spring 28. Thus, when a downward force is manually applied to the handle 27a pivoting the lever 27 clockwise, the yoke 27e pivots upwardly urging the assembly, including the nozzle 25 and the valve member 22, in a vertical direction to unseat the body portion of the valve member 22 and associated sealing washer 22d from the opening 17c. The heated water contained in the reservoir 17 will then pass through the opening 17c through the conduit 23 and the nozzle 25 into the receptacle which the user would place within the recess 14 to receive the heated water.

The above described combined valve and conduit assembly provides a structurally simple valve and conduit which are both supported directly on the reservoir 17. In assembling the appliance 11, the operating lever 27 may be initially assembled to the housing 13 and then the reservoir assembly, including the cover portion 13d of the housing 13, along with the reservoir 17 with its heating element 19 and the combined valve and conduit assembly 21, are dropped into the top opening of the housing and secured by means of a top assembly screw 30 and a lower assembly screw 32 which secures a reservoir bracket 34 to a wall of the housing 13. This provides a very simple assembly whereby the operative elements of the appliance 11 are all either assembled to the reservoir assembly or to the housing 13 and the assembly of these subassemblies is relatively simple. This simplicity is achieved by the fact that the valve operating lever 27 simply engages in abutting relationship with the nozzle 25 and has no complex connection thereto.

Obviously, many modifications and variations of the present invention are possible in light of the above teachings. Thus, it is to be understood that, within the scope of the appended claims, the invention may be practiced otherwise than as specifically described above.

What is claimed as new and desired to be secured by Letters Patent of the United States is:

1. The combination of a container and an underlying valve for controlling discharge of a liquid material comprising a liquid material container having a discharge opening in a lower wall thereof for gravity discharge of said liquid material contained therein, a valve including a valve member having a stem and a sealing portion, a discharge nozzle freely positioned and connected to said container by a cylindrical conduit which is resiliently axially collapsible, said stem being elongated and having a first end connected to said nozzle and a second end connected to said sealing portion, said nozzle and said valve member forming a rigid assembly which is movable via a value actuating means in a direction lengthwise of said stem between a closed position with said sealing portion closing said discharge opening through engagement with said lower wall and an open position displaced therefrom in which liquid material may be discharged from said nozzle after passing through said opening, around said valve stem and between said valve stem and said conduit.

2. The combination of claim 1 wherein said conduit is of flexible material having an annular mounting portion secured to said container at said first end in a position surrounding said discharge opening, said conduit having an annular connecting portion at said second end secured to said nozzle, said conduit having an intermediate portion between said connecting portion and said mounting portion which is axially compressible, manually operable control means engaging said nozzle to displace said nozzle axially compressing said conduit and opening said valve.

3. The combination of claim 2 wherein said conduit is resilient and biases said valve member to said closed position so that said valve is normally closed.

4. The combination of claim 3 wherein said conduit comprises a bellows having annularly extending pleats which are open in said closed position and are compressed as said valve moves to said open position, and manual actuating means engaging said nozzle to apply a force axially of said conduit to open said valve.

5. The combination of claim 4 wherein valve operating means engaging said nozzle on a plane which extends through the common axis of said nozzle and said valve stem to displace said nozzle along said common axis in moving said valve from said closed to said open position.

6. The combination of claim 5 wherein said valve operating means comprises a lever pivoted about an axis spaced laterally from said conduit and having a yoke which engages said nozzle, said nozzle being formed with a peripherally extending annular flange, said yoke engaging said flange at two spaced points on opposite sides of said valve stem axis to apply a compressive force on said conduit in a direction along said stem axis.

7. A liquid heating appliance comprising a housing supporting and enclosing a cup-shaped reservoir including a bottom and cylindrical side walls, said reservoir having a heater for heating liquid contained therein and having a discharge opening formed in the bottom thereof, a combination valve and conduit extending from the bottom of said reservoir through an opening in said housing to the exterior thereof, said valve including a valve member generally vertically reciprocable between the closed position obstructing said discharge opening through engagement with said reservoir bottom and an open position permitting discharge of liquid from said reservoir, said combination valve and conduit including a nozzle freely positioned in said opening in said housing and a generally cylindrical conduit being resiliently axially collapsible and connected to said reservoir at said reservoir opening at a first end and connected to said nozzle at a second end, said valve member including a valve stem connected to said nozzle, said nozzle and said valve member forming a rigid assembly being resiliently supported by said conduit and being movable axially of said conduit to move said valve between said closed and open positions via a valve actuating means, whereby liquid will flow by the influence of gravity and may be discharged from said nozzle after passing through said discharge opening, around said valve stem and between said valve stem and said conduit.

8. The liquid heating appliance of claim 7 wherein said housing is formed with a recessed area within which a liquid receiving receptacle is adapted to be received, said discharge opening being positioned above said recess with said nozzle extending into said recess to permit dispensing of liquid from said reservoir into a receptacle positioned in said recess.

9. The liquid heating appliance of claim 8 including manually operable valve control means mounted on said housing in engagement with said nozzle, said valve control means being operable to raise said nozzle to cause said valve member to move upwardly from said closed position to said open position.

10. The combination of claim 9 wherein said valve control means comprises a lever pivotally supported on said housing with a yoke formed on a first end in engagement with said nozzle and an operating handle on a second end with said pivotal support being between said first and second ends, said lever extending through an opening in said housing wherein said first end is within said housing and said second end is outside of said housing.

11. The liquid heating appliance of claim 10 wherein said nozzle is of generally cylindrical shape and is disposed with its axis aligned with said valve stem, said nozzle having a peripheral flange with an annular shoulder, said yoke engaging said shoulder at diametrically opposite points so that said lever applies a force on said conduit in a direction axially of said conduit.

12. The liquid heating appliance of claim 7 wherein said conduit has at least one annular pleat which permits said conduit to be shortened in its axial direction for the purpose of permitting said valve member to be displaced from said closed to said open position, said combination valve and conduit conducting liquid from said discharge opening to a position outside of said housing.

13. The liquid heating appliance of claim 7 wherein said nozzle is a generally cylindrical tube extending vertically and supported by said conduit in coaxial alignment therewith, said nozzle having an annular shoulder, manual valve actuating means extending from outside of said housing into said housing and into engagement with said annular shoulder.

14. The liquid heating appliance of claim 13 wherein said manual valve actuating means comprises a lever mounted on said housing for pivotal movement, about a pivot axis, said pivot axis being disposed intermediate the ends of said lever which has one end formed with a yoke engaging said nozzle and another end formed with a handle for manual actuation, said yoke engaging the underside of said annular shoulder at diametrically opposite points on a line parallel with said pivot axis.

15. The liquid heating appliance of claim 14 wherein said valve member comprises a circular body portion and a stem which extends normal to said body portion, said stem being elongated and having an upper end connected to said body portion and a lower end connected to said nozzle, said stem and said tubular nozzle being disposed coaxially, and a sealing gasket on the underside of said body portion to be clamped into sealing engagement with said reservoir bottom when said valve is in the closed position.

16. A water heating and dispensing appliance comprising a housing having a base, a column portion and a body portion, said housing being formed with a recessed area above said base for receiving a receptacle into which heated water is to be dispensed, said housing having a top opening closed by a reservoir assembly, said reservoir assembly including a top housing wall secured to a cup shaped reservoir, said top housing wall closing said top opening to complete an enclosure for said reservoir, said reservoir having a bottom wall with a sheathed heating element secured thereto, said housing body portion being formed with an opening above said recessed area, a combined valve and conduit supported on the bottom of said reservoir and extending through said body portion opening, said reservoir bottom being formed with a discharge opening, said combined valve and conduit including a generally cylindrical conduit which is supported on said reservoir in sealed communication with said discharge opening at a first end and supporting a rigid nozzle at a second end, a valve member having a body portion and a stem portion rigidly connected to said nozzle, said conduit being compressible in its axial direction by movement of said nozzle to generally vertically reciprocate said valve member from a first position wherein said body portion seals said discharge opening through engagement with said reservoir bottom to a second position in which water flows under the influence of gravity from said reservoir through said discharge opening, around said valve stem and between said valve stem and said conduit to be discharged through said nozzle.

17. The water heating and dispensing appliance valve operating lever which is pivotally mounted on said housing having a first end extending outside of said housing for manual actuation and a second end positioned within said housing in engagement with said nozzle, said lever being manually operable to displace said nozzle and move said valve member from said first to said second position.

18. The water heating and dispensing appliance of claim 11 wherein said reservoir assembly is readily removable from said housing separate from said operating lever which is in abutting engagement with said nozzle when said reservoir assembly is secured to said housing.

* * * * *